United States Patent [19]

Svendsen

[11] Patent Number: 5,212,668

[45] Date of Patent: May 18, 1993

[54] METHOD FOR QUANTIFICATION OF THE LEVEL OF WEATHER AND SEA NOISE DURING MARINE SEISMIC SURVEYS

[75] Inventor: Morten Svendsen, Rud, Norway

[73] Assignee: Geco A.S., Stavanger, Norway

[21] Appl. No.: 772,417

[22] Filed: Oct. 7, 1991

[30] Foreign Application Priority Data

Oct. 5, 1990 [NO] Norway .................................. 904343

[51] Int. Cl.⁵ ................................................ G01J 1/38
[52] U.S. Cl. ......................................... 367/21; 367/15
[58] Field of Search ....................... 367/15, 20, 21, 38, 367/59

[56] References Cited

U.S. PATENT DOCUMENTS 3,398,396 8/1968 Embree .................................. 367/46
4,468,761 8/1984 Rietsch .................................. 367/21

FOREIGN PATENT DOCUMENTS 2237642 5/1991 United Kingdom .

Primary Examiner—Ian J. Lobo
Attorney, Agent, or Firm—Jacobson, Price, Holman & Stern

[57] ABSTRACT

A method of quantifying the level of weather and sea noise during marine seismic surveys which often negatively effect the acquired data produced thereby, by recording this noise along the seismic line prior to the shot registration and possibly also during a break in the shot registration and/or after the conclusion of the shot registration, and obtaining a picture of these noise conditions which correspond to those which are found in the stacked records of common reflection points for improving the signal/noise ratio in the stacked CMP data.

20 Claims, 8 Drawing Sheets

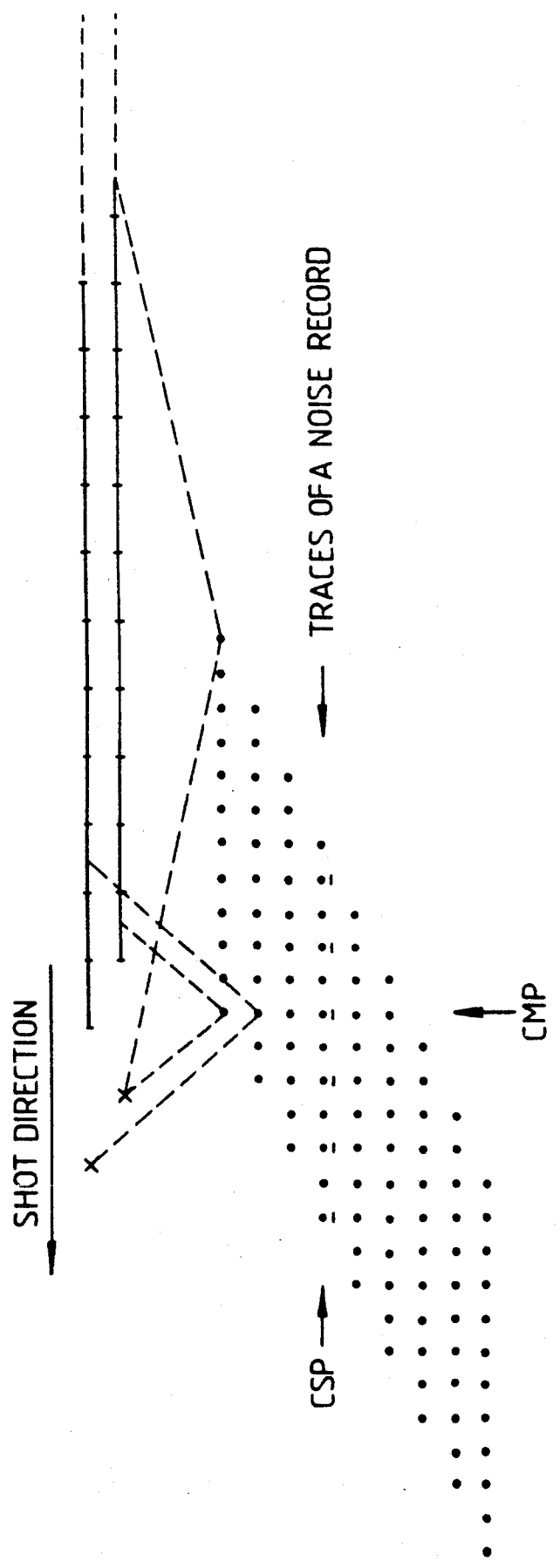

5,212,668

METHOD FOR QUANTIFICATION OF THE LEVEL OF WEATHER AND SEA NOISE DURING MARINE SEISMIC SURVEYS

BACKGROUND OF THE INVENTION

The invention concerns a method for quantification of the level of weather and sea noise during marine seismic surveys In particular it concerns a method for measurement, treatment and quantification of weather and sea noise in order to evaluate the effect of noise on the results of the seismic survey.

For definitions of terms and explanations of well known systems and methods used in seismic surveys, reference is made to "Encyclopedic Dictionary of Exploration Geophysics", 2. ed., complied by R. E. Sheriff, and published by the Society of Exploration Geophysicist in 1984, and "Introduction to Geophysical Prospecting", M. B. Dobrin and Carl H. Savit, 4. ed., McGraw-Hill, Singapore 1988, particularly Chapters 5 and 7. The latter publication may be regarded as a standard text in the field of geophysical prospecting, including seismic exploration.

It is a well-known fact that weather conditions affect the quality of the reflected seismic signals which are recorded by the hydrophone groups during a marine seismic survey. During bad weather conditions, waves and current generate noise which can be recorded by the hydrophones and in addition noise is also generated in the water by the streamer cable, e.g. turbulence noise and other flow noise. It is normal procedure, therefore, to evaluate the conditions in the survey area and possibly interrupt the survey when the noise conditions are considered to be unfavorable. Investigations have also shown that the noise picture is altered after the data have been processed at the processing center. Noise specifications for seismic data acquisition should therefore be related to the effect of the noise on the data after processing. In this connection, special consideration should be given to the ability of stacking to remove noise and thus improve the signal/noise ratio. Consideration should also be given to the fact that the signal level in the survey area can vary greatly from survey to survey.

It is a well-known fact that the strength of the seismic reflection signal varies greatly with parameters such as the geological conditions in the survey area, the distance to the target and the strength of the seismic energy source used.

The strength of the seismic signal can be determined by a number of methods, e.g. by analyzing data from previous surveys in the same area, by analysing brute stacks for common reflection points aboard the survey vessel, or somewhat more directly from a slightly processed shot record.

As a rule, such methods will give a good picture of the signal level in the final section, in that by processing, attempts are made to maintain the signal level, but to reduce the noise, i.e. improve the signal/noise ratio.

However, it will be desirable to be able to quantify, i.e., determine the quantity of, the noise level in processed or stacked data from measurements made during the actual data acquisition. A general problem in this connection is that a data acquisition has to be carried out from a full line of noise records only in order to generate a CMP stack and thus obtain a good picture of the noise level after stacking.

These noise records could be taken during the period between the recording of a single shot and the next firing. A typical operation is conducted with a 10 second shot interval and a subsequent recording period of 6-7 seconds duration However, it is difficult to make sure whether the noise recorded actually is wind or weather noise and does not partly contain residual energy from the previous shot. In all probability this will depend on the geology of the area and possibly also other geographical parameters.

It should be mentioned here that a CMP stack is a summation of traces which represent the same reflection point in the subsurface. Such a CMP stack is generated by the summation of the traces from various shots with different travelling times between source and hydrophone group. The number of folds, i.e. the number of traces which cover the same common reflection point or CMP, will depend on the number of hydrophone groups and the distance between each shotpoint. Even though there is equipment aboard the survey vessel to perform data processing such as a simple CMP stacking, in reality it will be difficult to collect a sufficient amount of noise records to correspond to a complete CMP gather.

BRIEF SUMMARY OF THE INVENTION

The object of the invention is therefore to provide a method of the type descried above and particularly to quantify the level of noise generated by weather and sea after processing. This object is achieved with a method characterized by the features of the invention as described in the specification.

BRIEF DESCRIPTION OF THE DRAWINGS

The invention will now be described in more detail with reference to the accompanying drawings wherein:

FIG. 1 is a graphic illustration of the situation during recording of traces which are intended to represent the same reflection point in the subsurface, i.e. CMP;

DETAILED DESCRIPTION

Figure 2A:
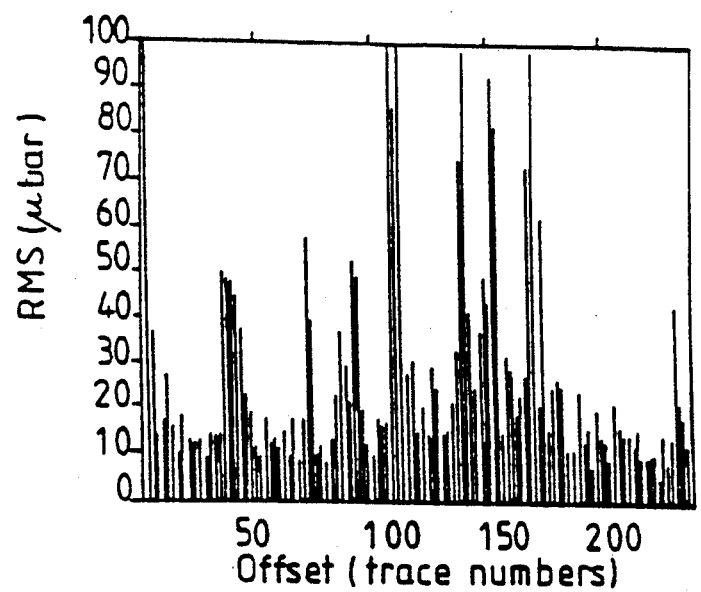
FIGS. 2a to 2f are graphs of the noise profile for six consecutive noise recordings during bad weather conditions as the RMS value (in microbars) of the noise recorded on the individual channels.
Figure 2C:
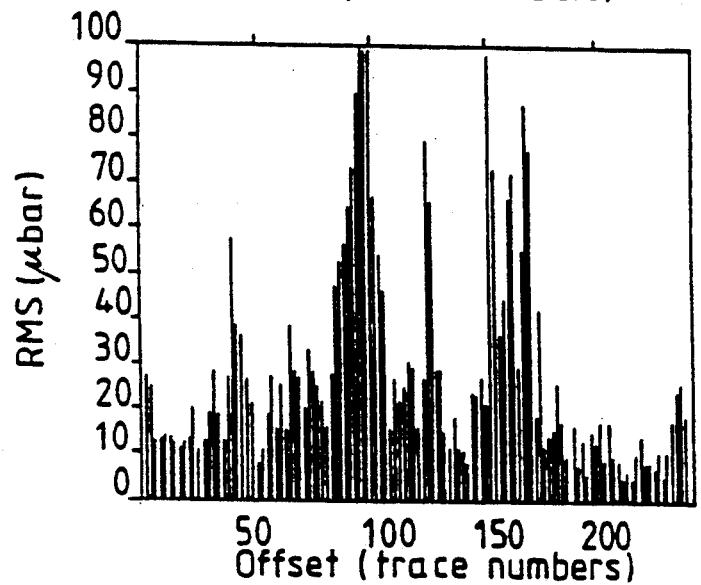
Figure 2B:
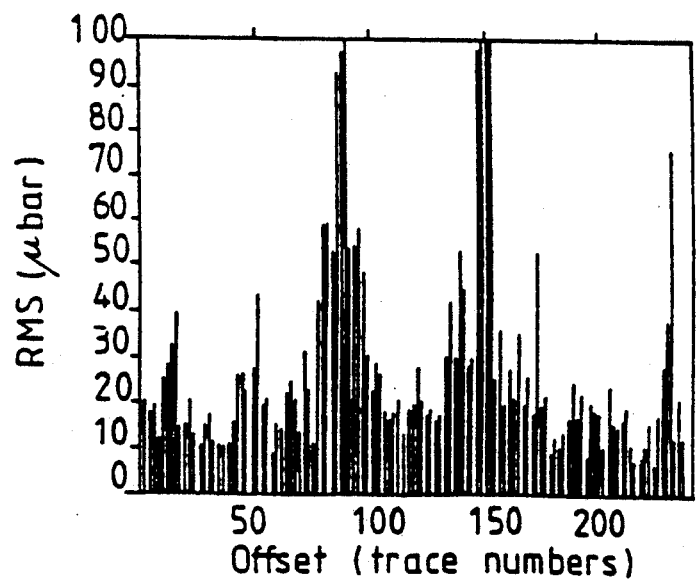
Figure 2D:
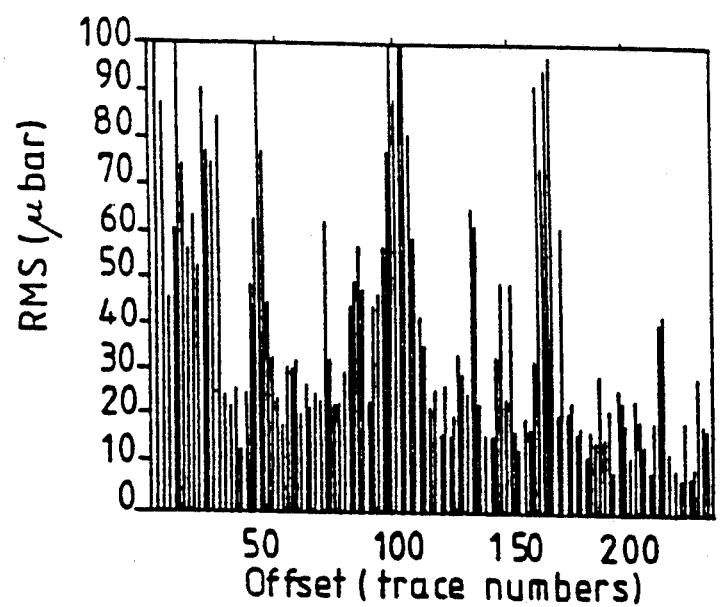
Figure 2F:
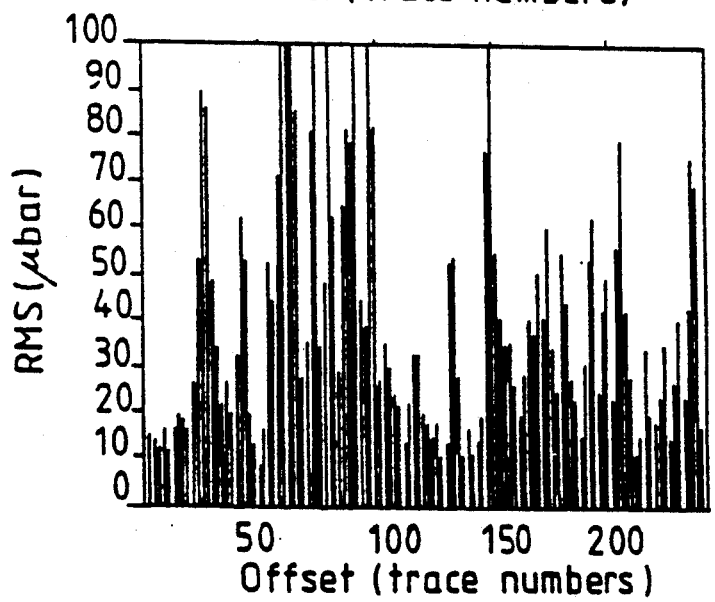
Figure 2E:
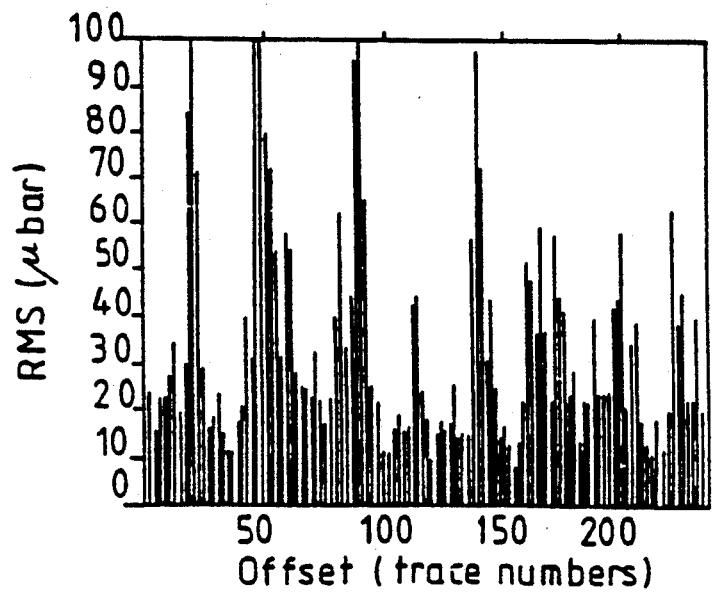
Figure 3A:
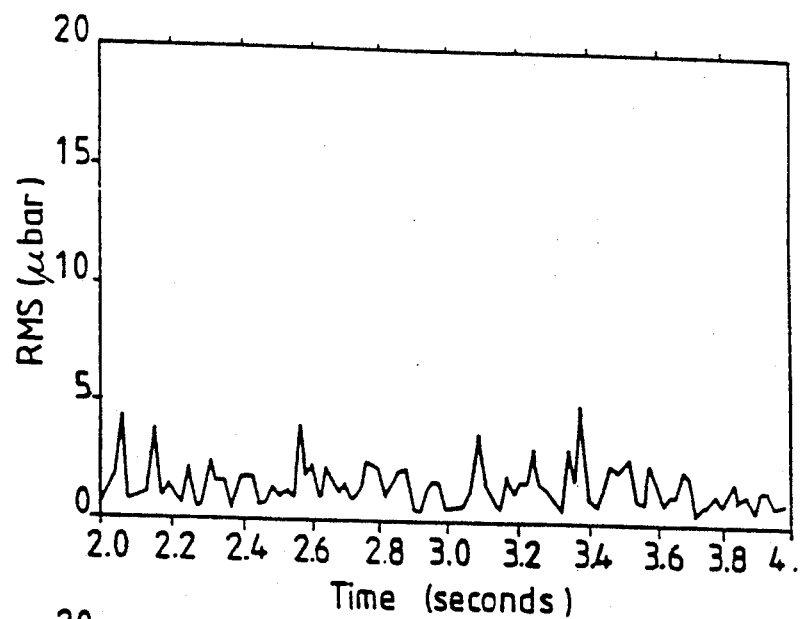
FIGS. 3a to 3c (stack weather noise) are graphs of the noise level in time windows of 20 ms. for three CMP stacked traces from different points in the noise line, where the X-axis represents time and the Y-axis represents the noise level.
Figure 3B:
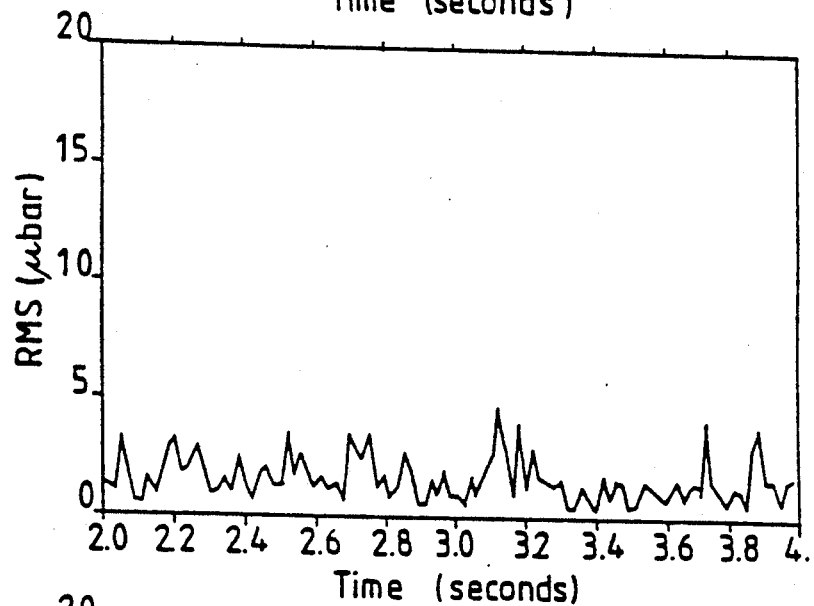
Figure 3C:
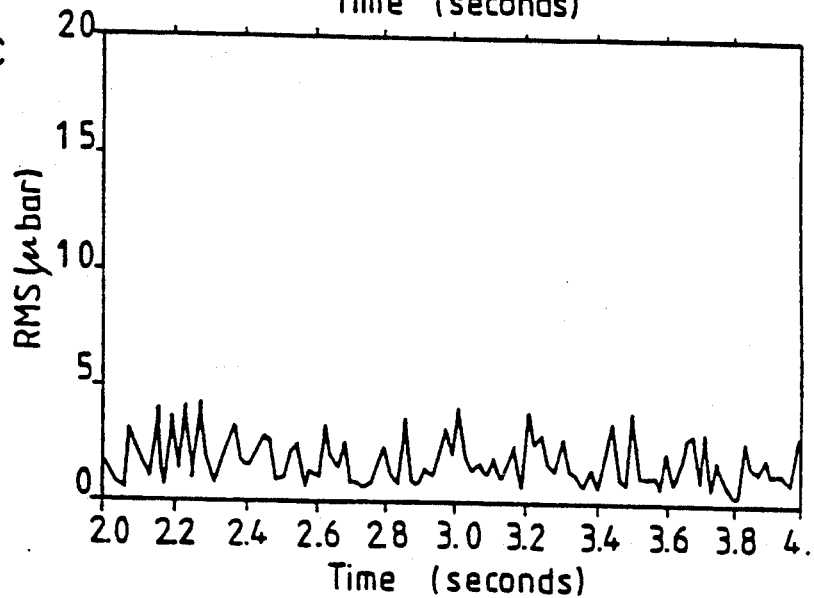
Figure 4A:
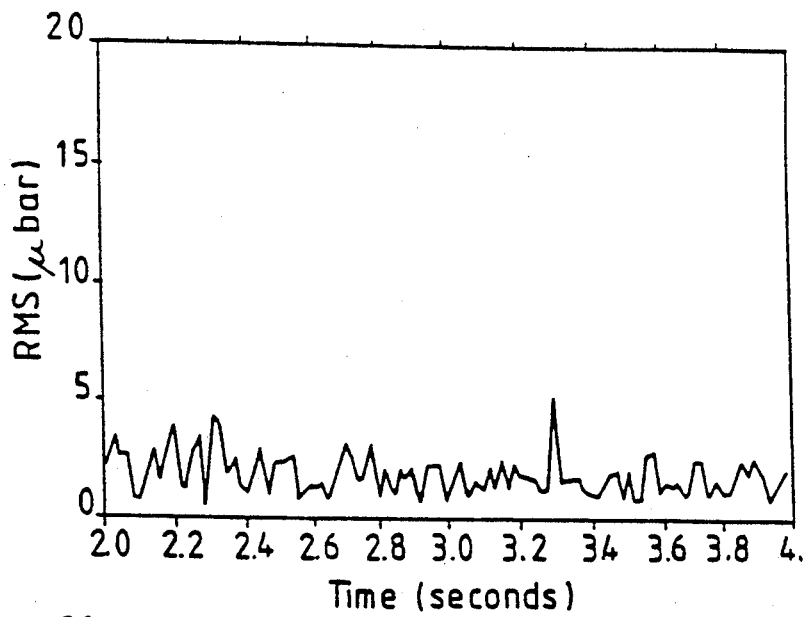
FIGS. 4a to 4c (summed noise record) are similar to FIGS. 3a to 3c, respectively, for stacked traces within the same CSP record.
Figure 4B:
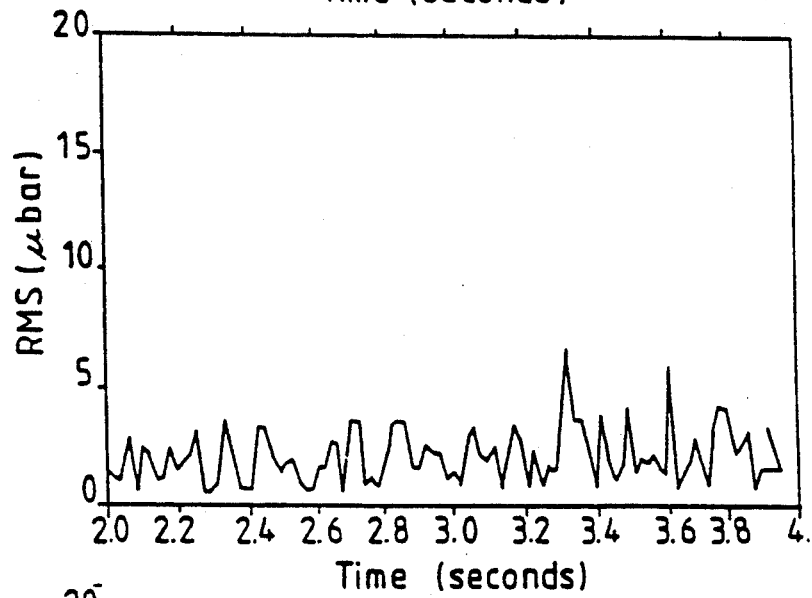
Figure 4C:
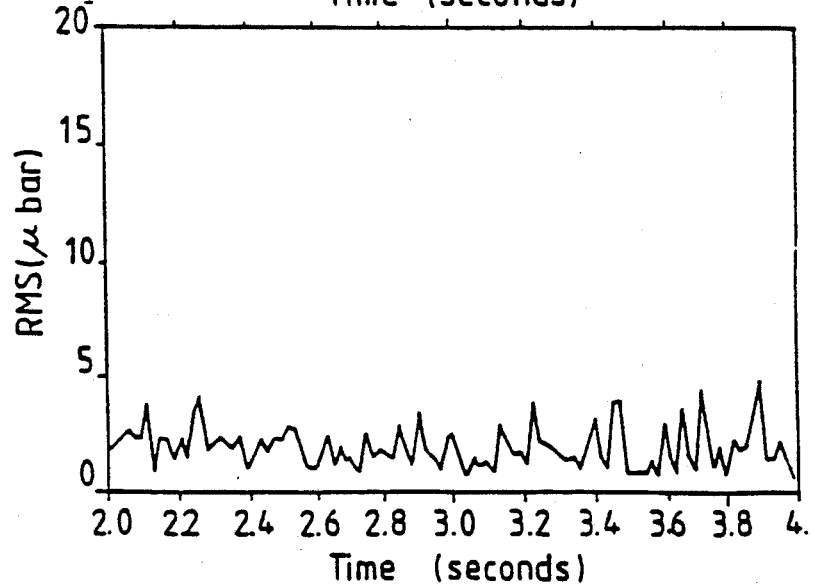
Figure 5:
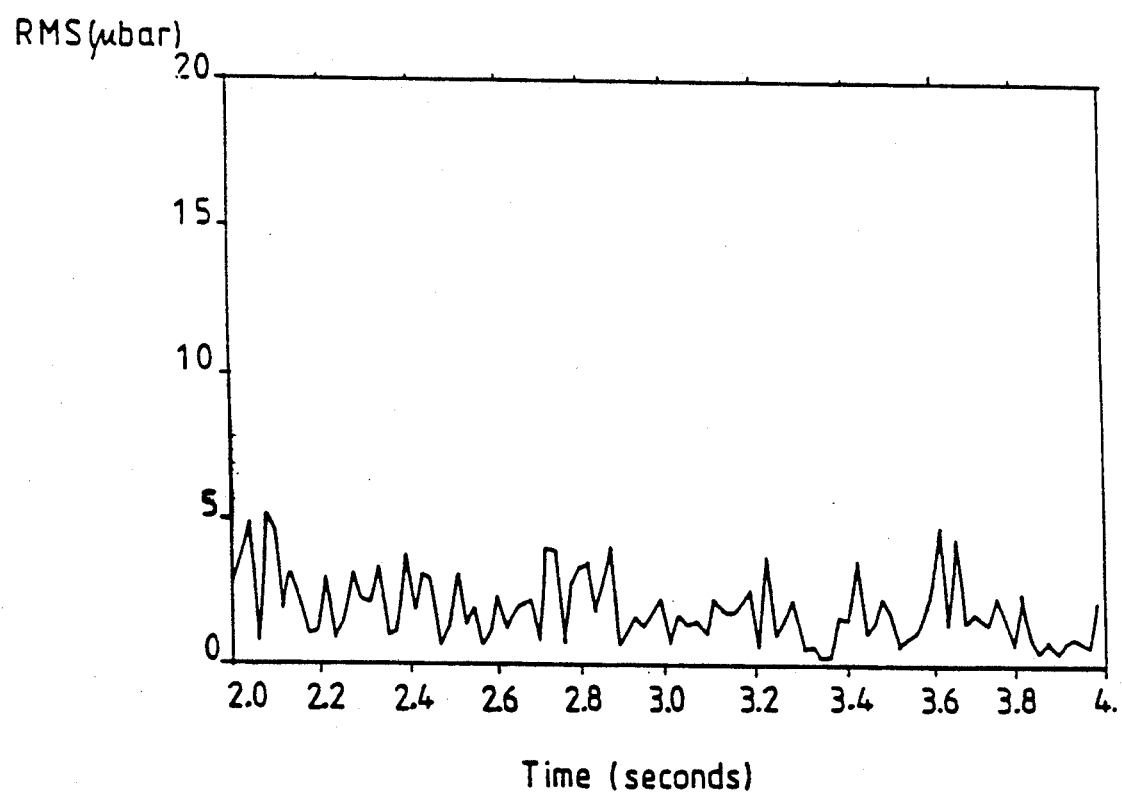
FIG. 5 (CMP stack) is an enlargement of a typical noise profile after stacking as illustrated in FIGS. 3a to 3c.
Figure 6:
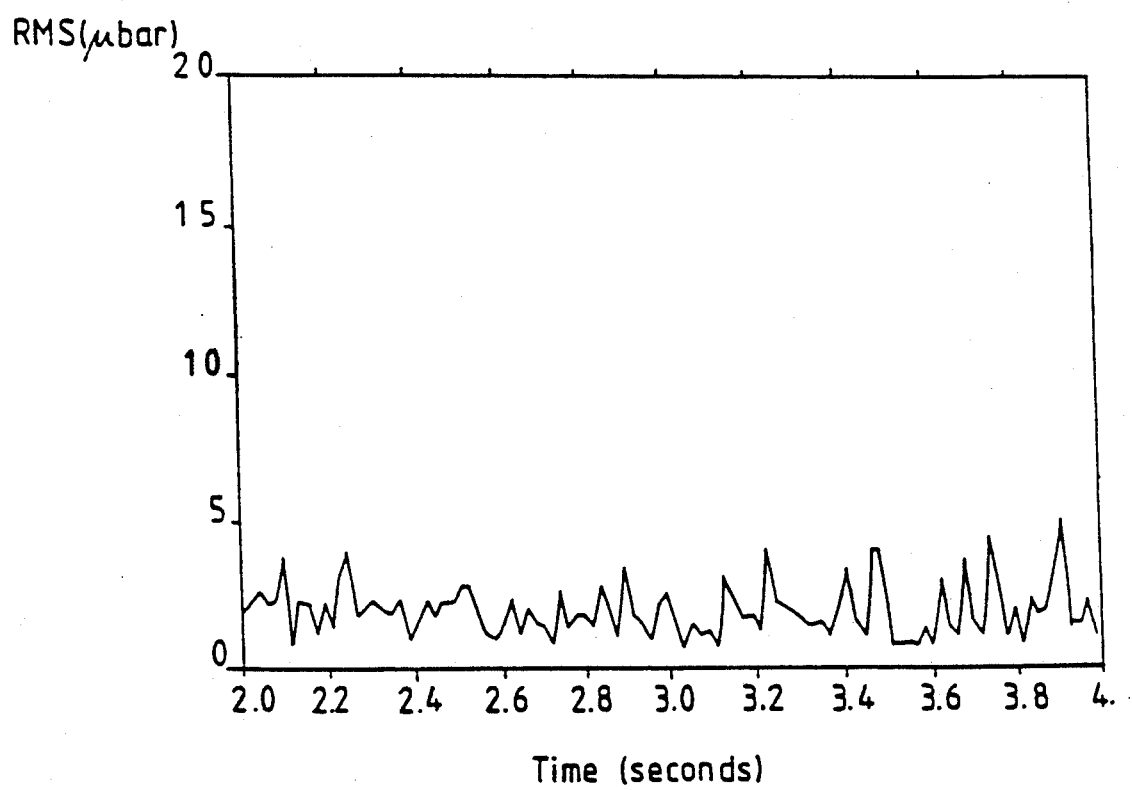
FIG. 6 (horizontal stack) is an enlargement of FIG. 4c showing a typical noise profile after stacking.
Figure 7A:
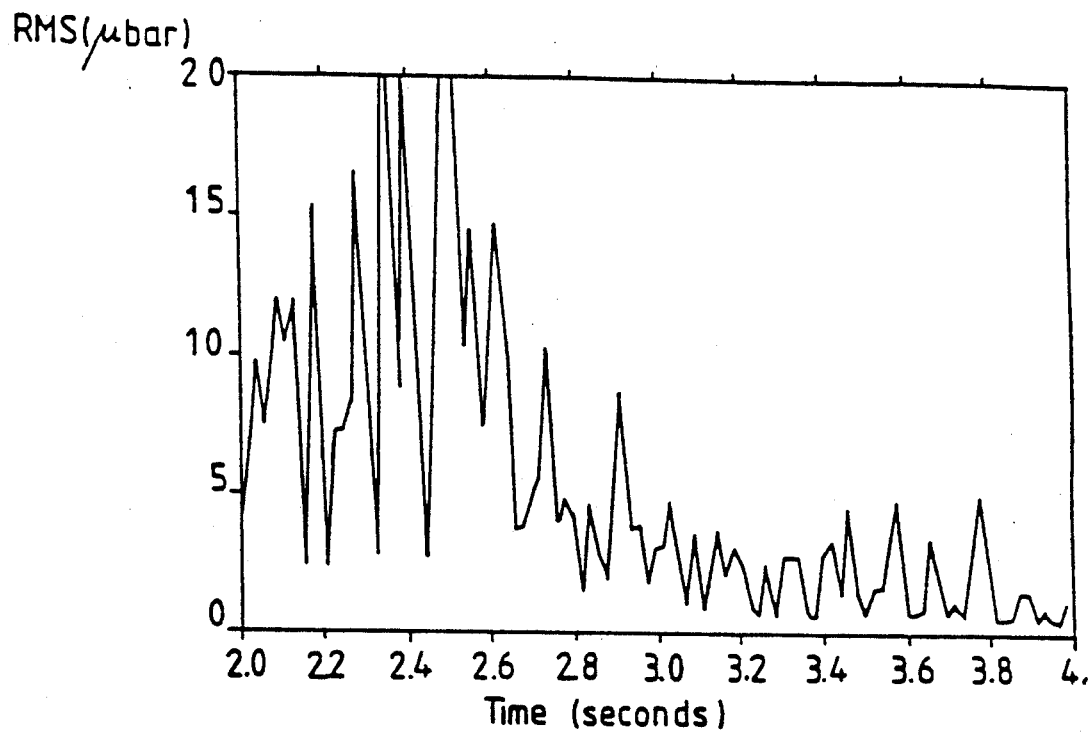
FIGS. 7a and 7b are graphs of signal strength for seismic reflection data (noise free data) in a particular 20 ms time window and the stacked noise level in the same time window, respectively.
Figure 7B:
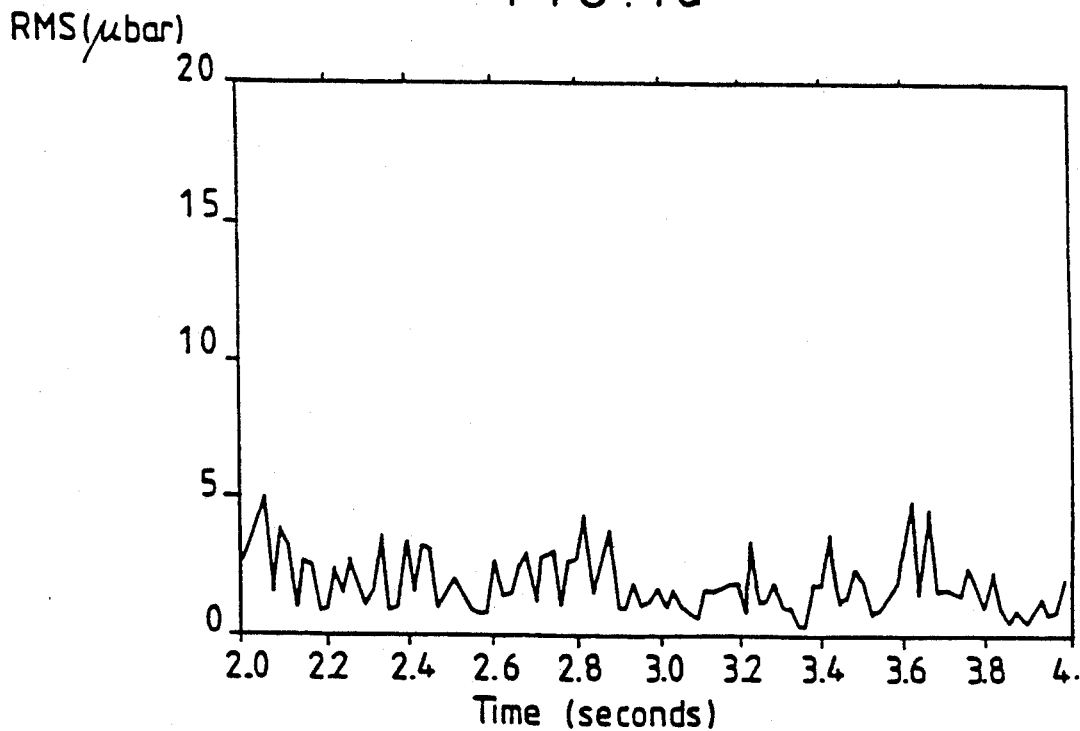

As a starting point it will be established that the method in accordance with the present invention can be implemented because weather and sea noise are typical examples of incoherent noise. This feature is clearly illustrated in FIGS. 2a-2f which show a typical unsystematic pattern both within each individual noise record and also between the consecutive noise records. This unsystematic pattern or the incoherence of the noise means that a stack of traces the same noise record in the CSP direction as illustrated in FIG. 1 will result in a noise level corresponding to that obtained from stacking all registrations of the in common reflection point CMP (the CMP direction of FIG. 1). The examples are obtained from recording over a line of approx. 13 km, i.e. with approx. 500 noise records or shotpoint records.

In brief, the intention of the method in accordance with the invention is now to take one or more noise records along the seismic line before the actual seismic survey of shot registrations begins. After the conclusion of the seismic survey, further noise records will be acquired along the seismic line. In this connection the noise trace can be generated by recording on some or on all of the hydrophone groups in the seismic cable. If the seismic line or shot line is especially long, it can be advantageous to interrupt the shot recordings to take a noise recording, e.g. halfway along the seismic line.

After the noise records are acquired, the individual traces within each record are stacked. The number of traces to be included in the stack depends on the actual number of folds in the record of the individual common reflection point CMP. If, e.g., the recording is performed on 120 channels or hydrophone groups and each common reflection point CMP is recorded 60 times, i.e. the coverage of each CMP is 60-fold, every other trace in the noise record is stacked if the latter has been taken on all 120 channels.

After the stacking the noise level of the noise stack can be analyzed by means of well-known data processing methods and possibly after the stack has been further processed, e.g. by the use of frequency filtering.

Thereafter the level of the stacked noises is compared with the signal level of the seismic signals received during the subsequent shotpoint registrations in that these signals are quantified and averaged, preferably with emphasis on the weakest reflectors which are of significance for the survey. Thereafter the signal/noise ratio of the seismic signals can be calculated in the course of the quality control aboard the vessel.

It can be an advantage to perform this kind of quality control online and base it on an acceptable level for the signal/noise ratio in the recorded signals which have been determined prior to the seismic survey.

By using the method in accordance with the invention, a picture of the weather and sea noise during an ongoing seismic survey can be obtained in an exceptionally simple way, in that the acceptable level corresponds to that which can be found in the processed and CMP stacked seismic reflection data. The noise level can be established immediately before the shooting of the seismic line starts, and noise records acquired after the shot registrations are completed and possibly also during a break in the shot registrations, e.g. halfway along the seismic line, will be able to supply the required check on the noise level found. As already mentioned, weather and sea noise are extremely incoherent and form an isotropic randomly fluctuating 3-dimensional sound pressure field in the survey area. Thus no special corrections are necessary, e.g. for NMO.

It will be obvious to specialists in the field that the method in accordance with the present invention can be implemented by simple means in an automated quality control system aboard the survey vessel.

I claim:

1. A method for determining the quantity of the level of weather and sea noise in marine seismic surveys utilizing a seismic energy source for producing seismic signals directed toward the area being surveyed and reflected from said area, and at least one seismic streamer cable having detectors in spaced relationship along the seismic streamer cable for detecting the reflected signals to produce shot recordings for said seismic signals comprising:
   obtaining at least one noise record along a seismic line of at least some of the channels in the seismic streamer at least one given point in time before an actual shot recording;
   stacking individual traces forming part of the noise record; and
   determining the number of traces used in the stack by the number of folds in the gather of each common reflection point to provide the quantity of the level of weather and sea noise.

2. The method as claimed in claim 1 and further comprising:
   obtaining at least one of said noise records after said actual shot recordings; and
   stacking all of said individual traces forming part of said noise records.

3. The method as claimed in claim 1 and further comprising:
   obtaining at least one of said noise records during a break in said shot recordings; and
   stacking all of said individual traces forming part of said noise records.

4. The method as claimed in claim 2 and further comprising:
   obtaining at least one of said noise records during a break in said shot recordings; and
   stacking all of said individual traces forming part of said noise records.

5. The method as claimed in claim 1 and further comprising:
   obtaining said noise records at a position halfway along said seismic line.

6. The method as claimed in claim 2 and further comprising:
   obtaining said noise records at a position halfway along said seismic line.

7. The method as claimed in claim 3 and further comprising:
   obtaining said noise records at a position halfway along said seismic line.

8. The method as claimed in claim 4 and further comprising:
   obtaining said noise records at a position halfway along said seismic line.

9. A method as claimed in claim 1, and further comprising:
   filtering said stacked noise traces.

10. A method as claimed in claim 2, and further comprising:
    filtering said stacked noise traces.

11. A method as claimed in claim 3, and further comprising:
    filtering said stacked noise traces.

12. A method as claimed in claim 8, and further comprising:
    filtering said stacked noise traces.

13. A method as claimed in claim 1, and further comprising:
    analyzing said stacked noise traces; and determining the quantity of said stacked noise tracks with respect to the noise level.

14. A method as claimed in claim 2, and further comprising:
    analyzing said stacked noise traces; and
    determining the quantity of said stacked noise traces with respect to the noise level.

15. A method as claimed in claim 3, and further comprising:
    analyzing said stacked noise tracks; and
    determining the quantity of said stacked noise traces with respect to the noise level.

16. A method as claimed in claim 12, and further comprising:
    analyzing said stacked noise traces; and determining the quantity of said stacked noise traces with respect to the noise level.

17. A method as claimed in claim 1 and further comprising:
    determining the amplitude of seismic signals received during shot recording;
    comparing and amplitude of said seismic signals with said quantity of noise level;
    determining the quantity of said seismic signals;
    averaging said quantified seismic signals with emphasis on weaker reflectors significant for the survey; and
    determining the signal/noise ratio of said seismic signals.

18. A method as claimed in claim 2 and further comprising:
    determining the amplitude of seismic signals received during shot recording;
    comparing the amplitude of said seismic signals with said quantity of noise level;
    determining the quantity of said seismic signals;
    averaging said quantified seismic signals with emphasis on weaker reflectors significant for the survey; and
    determining the signal/noise ratio of said seismic signals.

19. A method as claimed in claim 3 and further comprising:
    determining the amplitude of seismic signals received during shot recording;
    comparing the amplitude of said seismic signals with said quantity of noise level;
    determining the quantity of said seismic signals;
    averaging said quantified seismic signals with emphasis on weaker reflectors significant for the survey; and
    determining the signal/noise ratio for said seismic signals.

20. A method as claimed in claim 16 and further comprising:
    determining the amplitude of seismic signals received during shot recording;
    comparing the amplitude of said seismic signals with said quantity of noise level;
    determining the quantity of said seismic signals;
    averaging said quantified seismic signals with emphasis on weaker reflectors significant for the survey; and
    determining the signal/noise ratio of said seismic signals.

* * * * *